(12) United States Patent
Lue et al.

(10) Patent No.: US 6,667,527 B2
(45) Date of Patent: Dec. 23, 2003

(54) TEMPERATURE SENSOR WITH SHELL

(75) Inventors: Brian Lue, Mountain View, CA (US);
Tetsuya Ishikawa, Saratoga, CA (US);
Liang-Guo Wang, Fremont, CA (US)

(73) Assignee: Applied Materials, Inc, Santa Clara, CA (US)

( * ) Notice: Subject to any disclaimer, the term of this patent is extended or adjusted under 35 U.S.C. 154(b) by 0 days.

(21) Appl. No.: 10/144,216

(22) Filed: May 10, 2002

(65) Prior Publication Data

US 2003/0209773 A1 Nov. 13, 2003

(51) Int. Cl.[7] .............................................. H01L 31/058
(52) U.S. Cl. ........................................ 257/467; 374/121
(58) Field of Search .......................................... 257/467

(56) References Cited

U.S. PATENT DOCUMENTS

| | | | |
|---|---|---|---|
| 2,465,322 A | | 3/1949 | Considine |
| 4,215,275 A | | 7/1980 | Wickersheim |
| 4,278,349 A | | 7/1981 | Sander |
| 4,459,043 A | | 7/1984 | Luke |
| 4,560,286 A | | 12/1985 | Wickersheim |
| 4,592,664 A | | 6/1986 | Bijlenga et al. |
| 4,729,668 A | | 3/1988 | Angel et al. |
| 4,752,141 A | | 6/1988 | Sun et al. |
| 4,926,227 A | * | 5/1990 | Jensen ........................ 257/467 |
| 5,098,198 A | | 3/1992 | Nulman et al. |
| 5,556,204 A | | 9/1996 | Tamura et al. |
| 5,683,181 A | | 11/1997 | Shepard |
| 5,775,808 A | | 7/1998 | Pan |
| 5,831,333 A | * | 11/1998 | Malladi et al. ............. 257/467 |
| 5,876,119 A | | 3/1999 | Ishikawa et al. |
| 6,033,108 A | | 3/2000 | Berthold et al. |
| 6,045,259 A | | 4/2000 | Djeu |

OTHER PUBLICATIONS (Author Unknown), Fluoroptic Thermometers 700 Series, Internet Document (www.luxtron.com/product/product-p-dfs/700series/catalog.pdf), Apr. 24, 2002, 12 pages.

(Author Unknown), Accufiber Models 10 & 100 Optical Fiber Thermometers, Internet Document (www.luxtron.com/product/product-pdfs/m10-100.pdf), Apr. 24, 2002, 4 pages.

* cited by examiner

Primary Examiner—Gene M. Munson
(74) Attorney, Agent, or Firm—Aagaard & Balzan, LLP; Joseph Bach (57) ABSTRACT

In at least one embodiment, the invention is a temperature sensor having a temperature sensitive material positioned within a shell. The shell has a first section and a second section, which are attached together by a non-adhesive bond. The non-adhesive bond being an atomic bond, such as a diffusion bond. The temperature sensitive material is capable of emitting a radiation signal which varies in its magnitude and character as the material's temperature changes. The shell allows transmission of the radiation signal through the shell to an external processor. Analysis of the emitted radiation signal by the processor can provide a temperature measurement. The temperature sensitive material is a phosphorescent, such as a phosphor. The shell may be made of a material which can be diffusion bonded, such materials include a silicon comprising material, a glass, a plastic, a sapphire and a quartz. The diffusion bond seals the shell, thus preventing the temperature sensitive material from being exposed to the surrounding environment. The sensor can include a stem attached to the shell. The stem is capable of transmitting and receiving radiation signals to and from the sensor by either positioning an optical fiber adjacent the sensor or by containing one or more waveguides.

53 Claims, 8 Drawing Sheets

TEMPERATURE SENSOR WITH SHELL

BACKGROUND

Fabrication of semiconductor devices typically involves the deposition and etching of multiple thin film layers on a substrate. This deposition and etching of the film layers is usually done in a vacuum chamber. Controlling the deposition and etch rate uniformity are critically important to the manufacture of the devices. In this regard, precise measurement of the temperature during fabrication is particularly important.

A variety of methods and devices have been developed for this type of temperature measurement. One common approach has been to locate thermocouples, thermistors or resistance thermometers in the chamber to measure the temperature. In some cases, the temperature measuring device has been embedded in the substrate support, where it is protected from the environment of the vacuum chamber. The devices are normally connected by electrical wires to allow the temperature to be read.

Unfortunately, the use of electrical connections with these temperature measurement devices has caused a wide variety of problems. The wires attached to these devices can be undesirable as the metal in the wires may affect the chamber's magnetic and/or electrical fields. The electrical signals are not desirable when the application requires electrical isolation and/or low electrical noise. The location and/or movement of the item to be measured may make using these temperature measurement devices difficult or impossible. Elements of these devices (e.g. wires, thermocouple junctions) can be damaged by the corrosive chemical environment of the chamber. Such damage can cause erroneous and erratic temperature readings. The attachment of these measuring devices to the chamber can sometimes actually alter the temperatures to be measured. The use of these devices can be impractical when temperature measurements need to be taken over a large area or when many measurements have to be taken in a small area.

One specific problem is that contact between a conventional temperature probe (e.g. a thermocouple) and the substrate can cause defects to be formed on the substrate, around the contact point. These defects can greatly reduce the production yield, increasing both production costs and time.

Another problem is contamination of the substrate and the chamber caused by conventional temperature probes. The high temperature and low pressure environment of the chamber can cause conventional probes positioned in the chamber to out-gas or otherwise discharge contaminates. Adhesives are one type of material known for causing contamination. Mobile ions from the adhesives can contaminate the chamber. Such contamination can easily cause defects on the substrate, lowering the overall production yield. Also, since the contaminates attach to the chamber, cleaning may be required more often, increasing the cost and lowering the production rate.

One approach to these problems has been to employ radiation pyrometry techniques. These techniques measure the temperature of an object by means of the quantity and character of the energy it radiates. In this way a temperature measurement can be made optically from a distance without the use of wires. On example of such an approach is to apply a temperature sensitive material onto the item to be measured, use a light probe to excite the material, causing it to emit radiation, and then analyzing the emitted radiation to obtain a temperature value.

U.S. Pat. No. 4,560,286, entitled "OPTICAL TEMPERATURE MEASUREMENT TECHNIQUES UTILIZING PHOSPHORS", by Wickersheim, hereby incorporated by reference in its entirety, describes a method and an apparatus for measuring the temperature of an object provided with a phosphor material. One known application of this method and apparatus involves placing a small amount of a temperature sensitive material on the backside of the substrate. A light detecting member is provided within the substrate support member to measure the emitted radiation from the temperature sensitive material. A processor quantifies the emitted radiation and determines the temperature of the substrate.

This approach has several disadvantages. The phosphor material may migrate into the silicon substrate. The process of applying the temperature sensitive material to the backside of the substrate requires additional processing steps, which are both time consuming and expensive.

Another approach is set forth in U.S. Pat. No. 5,876,119, entitled "IN-SITU SUBSTRATE TEMPERATURE MEASUREMENT SCHEME IN PLASMA REACTOR", by Ishikawa, et. al., hereby incorporated by reference in its entirety, which discloses a method and apparatus for non-contact temperature measurement of a substrate in-situ. This is achieved by measuring the temperature of a substrate support member and an intermediate member, located between the substrate and the substrate support member. With the intermediate member having a known thermal relationship with the substrate, the temperature of the substrate can be determined by calibration or application of a heat transfer equation. Some embodiments of this apparatus can use an adhesive to secure the intermediate member in place.

Therefore, a need exists for a device that allows for temperature measurement without the use of thermocouples, thermistors or resistance thermometers, or any wires attached thereto. The device needs to be capable of measuring the temperature remotely, without needing to be in direct contact with the item being measured (e.g. the substrate should not be directly contacted). The device must not cause contamination of other structures, such as the substrate or the chamber, by out-gassing or any other discharge. The device and its use should minimize the overall cost and the production time, and maximize the production yield.

SUMMARY

Some embodiments of the present invention include a sensor having a temperature sensitive material positioned within a shell. The shell has a first section and a second section, which are attached together by a non-adhesive bond. The non-adhesive bond is an atomic bond, such as a diffusion bond. The temperature sensitive material is capable of emitting a radiation signal which varies in its magnitude and character as the material's temperature changes. The shell allows transmission of the radiation signal through the shell to an external processor. Analysis of the emitted radiation signal by the processor provides a temperature measurement of the temperature sensitive material.

In one embodiment, the temperature sensitive material is a phosphorescent, such as a phosphor. The shell may be made of a material that can be diffusion bonded, such as a sapphire or a quartz. In other embodiments a silicon comprising material, a glass, or a plastic is used for the shell. The diffusion bonding seals the shell, thus preventing the temperature sensitive material from being exposed to the surrounding environment. This reduces the potential for contamination of the adjacent structures, such as the substrate or chamber. The likelihood of contamination is also reduced since the diffusion bond lacks any adhesive, which could otherwise discharge into the surrounding environment. The temperature sensitive material can be protected from radiation heating by a reflective member.

The sensor can include a stem attached to the shell. The stem can function to secure an optical fiber in a position where it can transmit and receive radiation signals to and from the sensor. In some embodiments the stem contains one or more waveguides, which likewise allow the transmission and reception of radiation signals to and from the sensor. The stem may be a sapphire or a quartz, which is diffusion bonded to the shell.

In certain embodiments, the stem includes waveguides which allow the transmission of two or more separate radiation signals. One waveguide is used to transmit radiation signals to and from the sensor, which has a first temperature sensitive member, and a separate waveguide is used to transmit radiation signals to and from a second temperature sensitive member. In such cases the second temperature sensitive member can be used to obtain temperature measurements of adjacent structures, such as the substrate support. A prism can be used to direct the radiation signals between the second waveguide and the second temperature sensitive member.

In some embodiments of the present invention instead of a stem, a single waveguide is mounted to the shell of the sensor. An example of such an embodiment has the waveguide positioned to a side of the sensor in a cantilever arrangement. Such waveguides can use a prism to direct the radiation signals between the waveguide and the sensor.

DETAILED DESCRIPTION

In some embodiments, the Applicants' invention is a temperature sensor containing a temperature sensitive material that can emit radiation signals, allowing remote temperature measurements to be made. The sensor seals the temperature sensitive material within a shell, which is generally transparent to the emitted radiation signals. As the temperature of the temperature sensitive material changes, so does the amount and character of the emitted radiation. The radiation signals are received by an optical fiber, which transmits the signal to a processor for conversion into a temperature value.

One advantage of some embodiments of the present invention is that they allow temperature measurements to be obtained without any contamination occurring to surrounding structures. Instead of being constructed with adhesives, the sensor uses non-adhesive bonding, such as diffusion bonds. With the sensor being sealed without adhesives, other neighboring structures (e.g. the substrate or the chamber) are not contaminated by discharges (e.g. out-gassing) from an adhesive. This results in a reduced potential for damage to these structures, increased production yield and less cleaning.

Diffusion bonds also have the added benefit of being significantly stronger than typical adhesives used for such applications. Furthermore, diffusion bonding allows greater control of the dimensions of the sensor than does the use of adhesives. Adhesive bonds can vary greatly in their thicknesses and they lack the strength to allow later milling or polishing of the sensor. In contrast, diffusion bonds are very thin and uniform, as well as strong enough to withstand milling and polishing.

The sensor can be positioned in a vast variety of locations. The sensor is completely self-contained, and as such it does not require any instrumentation or power source to be connected to it. This provides much more freedom in the positioning of the sensor. The sensor can effectively be positioned in any location that a temperature measurement is desired.

Also, since the sensor is made of a material (e.g. sapphire or quartz) that can sustain exposure to the caustic environments found within plasma chambers, the sensor can be placed inside a functioning chamber.

The sensor can also be positioned in a variety of orientations. Since sensor's shell is effectively transparent to the radiation transmitted from the temperature sensitive material, the orientation of the sensor relative to the radiation receiver (e.g. optical fiber) can vary greatly., That is, since radiation is emitted in all directions from the sensor, a radiation measurement can be obtained regardless of. the orientation of the sensor.

The Applicants' invention also allows the temperature of an object (e.g. a substrate) to be measured without directly contacting it. This reduces the potential for damage to the object and provides increased production yields.

Figure 1:
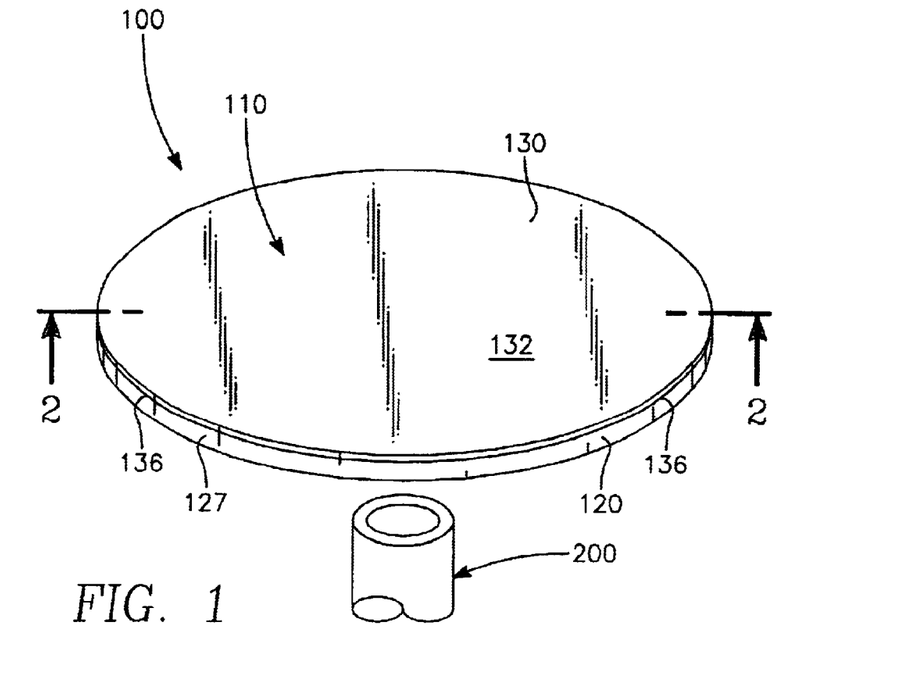
FIG. 1 is an isometric view of a sensor assembly in accordance with an embodiment of the present invention.
Figure 2:
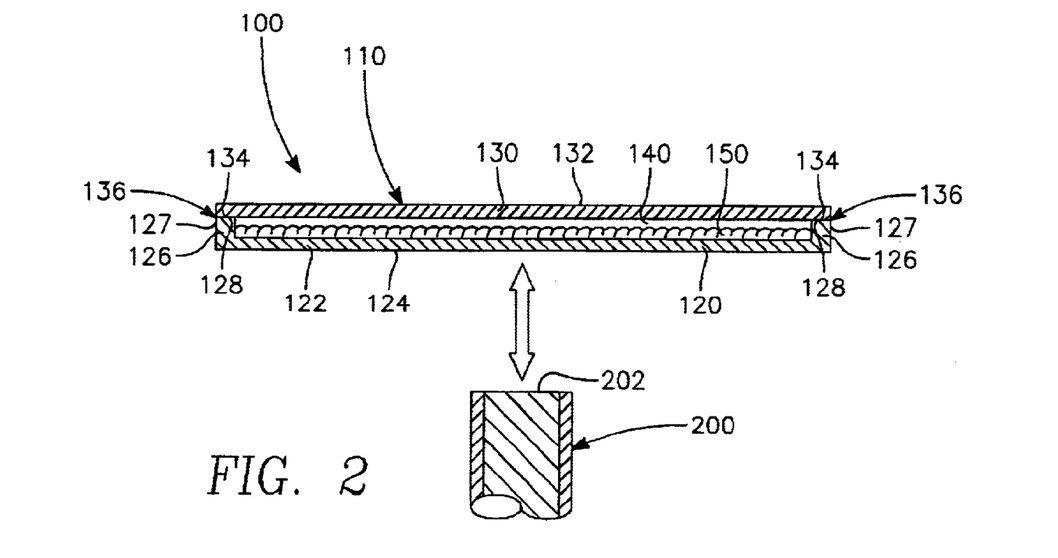
FIG. 2 is a side cross-sectional view along the 2—2 line of FIG. 1, of a sensor assembly in accordance with an embodiment of the present invention.

In some embodiments, the present invention is embodied in a sensor 100, which is formed in a disk shape, as shown in FIGS. 1 (FIG. 1) and 2 (FIG. 2). The sensor 100 is capable of transmitting a radiation signal (e.g. visible light or an infrared signal) to an adjacent optical fiber 200. As shown in the cross-section of FIG. 2, the sensor 100 includes a temperature sensitive material 150 positioned within a shell 110. At least a portion of the shell 110 is transmissive to the radiation signal emitted by the temperature sensitive material 150. In some embodiments the entire shell 110 is generally transparent to the radiation signal.

The sensor 100 functions to allow its temperature to be determined by a measurement and analysis of the radiation that the temperature sensitive material 150 emits. The amount of radiation emitted by the temperature sensitive material 150 for a given temperature has a known relationship. A reading of the emitted radiation is fed to and then quantified by a processor (not shown), and compared with known values to determine the temperature of the sensor 100.

Typically, the process of temperature measurement includes first using the optical fiber 200 to excite (e.g. by a flash of light), the temperature sensitive material 150 to cause it to emit a radiation signal, and then receiving the radiation signal with the optical fiber 200 at an end 202. The optical fiber 200 transmits the radiation signal for analysis by a processor (not shown). The processor determines the temperature value by analyzing the decay of the radiation signal.

Systems for determining temperature values from the radiation emitted by a temperature sensitive material are commercially available. Such thermometry systems can be obtained from Luxtron Corporation of Santa Clara, Calif. Such systems available from Luxtron Corporation include the TRUETEMP MODEL 10, TRUETEMP MODEL 100, ACCUFIBER MODEL 10, ACCUFIBER MODEL 100 and 700 SERIES FLUOROPTIC thermometers (including the MODEL 710R, MODEL 712R and MODEL 790).

The sensor 100 can be positioned anywhere a temperature measurement is sought. The sensor 100 can be located in or out of a chamber, it can be positioned by itself, adjacent to, or in direct contact with, an object to be measured. In certain embodiments the sensor 100 is attached to the object to be measured by a thermal foil or an adhesive. Locations for the sensor 100 include the chamber pedestal 20 (support structure or chuck), the chamber roof and the lid. In some embodiments, the sensor 100 is positioned just below a substrate 10, as shown in FIG. 5c. This allows a determination of the temperature of the substrate 10 to be made without actually contacting the substrate 10.

Returning to FIGS. 1 and 2, depending on the embodiment, the shell 110 functions to hermetically seal the temperature sensitive material 150 within the sensor 100. This keeps the temperature sensitive material 150 from coming into contact with the surrounding environment. Thus, the sensor 100 can be placed into caustic environments, such as those typically found in functioning plasma chambers, without any degradation or damage to the material 150. Further, as described in detail below, the shell is bonded together in a manner that inhibits contamination of the surrounding structures (such as a substrate and/or the chamber).

The shell 110 can be any of a variety of materials that will transmit radiation in the specific wavelengths used in the particular application. In some implementations, the shell 110 is made of a material which is sufficiently strong and durable so that the sensor 100 can be exposed to the caustic and variable pressure environments of a plasma reactor, without unacceptable damage and/or wear. Also, in such embodiments the material may be inert to plasma processing environments. Further, the material of the shell 110 should be substantially transparent to the radiation emitted by the temperature sensitive material 150, such that accurate readings of the radiation signals can be obtained. Such materials include silicon comprising materials, glass, plastic, sapphire and quartz. In this embodiment, the shell is made of a material which can be diffusion bonded, such as a sapphire or a quartz.

The shell 110 can be formed in any of a variety of shapes. In some embodiments, the shell 110 has a disk shape, that is, it is round with flat top, bottom and side surfaces. The thickness of the shell can vary depending on the requirements of the specific use that it is employed and the material used.

Two of the factors affecting the thickness of the shell 110 are its structural strength and rate of temperature change of both the shell structure and the temperature sensitive material 150. The required structural strength is dependent on the forces that will be applied to the shell 110 by the surrounding environment. One example of such forces are those resulting from a pressure differential between the surrounding environment and an internal cavity 140 of the sensor 110. As noted in detail herein, in some embodiments the cavity 140 is at or near a vacuum and in other embodiments the cavity is at or near the atmospheric pressure. The specific design of the shell 110 is directly dependent on the pressure of the cavity 140 relative to the surrounding environments.

The thickness of the shell 110 affects the amount of time necessary for the temperature sensitive material 150 to equilibrate with the temperature of the object to be measured. Generally, the thicker the shell 110, the longer it will take for the temperature sensitive material 150 to reach the temperature of the measured object. In applications where a quick temperature measurement response is desired (e.g. for tracking fast thermal transients), the shell 110 is kept at a minimum thickness.

The thickness of the shell 110 can also be set so that the temperature of the temperature sensitive material 150 will follow the temperature within a particular object, such as a substrate. That is, the thickness of the shell 110 can be dependent on the thickness and material of the object to be measured. In a particular application, the shell thickness needed for the specific application can be determined by one skilled in the art using well known analytical and/or empirical methods for structural loading and heat transfer.

The shell 110 of the sensor 100 includes a first or lower section 120, a second or upper section 130 and the cavity 140, defined between the lower and upper sections. The lower section 120 of the shell 110 includes a bottom portion 122, a bottom surface 124, side portions 126, side surfaces 127 and lower joint surfaces 128.

The bottom portion 122 can be any of a variety of shapes, which will connect with the upper section 130, to form the shell 110 and define the cavity 140. As shown in FIG. 2, the bottom portion 122 is generally planar and extends between the side portions 126. The bottom portion 122 and the side portions 126 form a generally U-shape which defines a portion of the cavity 140. This U-shape can be created by a counter bore on a solid lower section 120. The U-shape of the bottom portion 122 facilities the deposition of the temperature sensitive material 150 therein. The side portions 126 function as barriers to keep the temperature sensitive material 150 in the portion of the cavity 140 defined by the lower section 120.

In some embodiments, the bottom portion 122 is of substantially uniform thickness with a substantially flat bottom surface 124. The thickness of the bottom portion 122 can vary depending the material used and the specific application of the sensor 100. The side portions 126 rise above the bottom portion 122 and have substantially flat side surfaces 127 and lower joint surfaces 128.

With the lower section 120 and the upper section 130 bonded to form the shell 110, the lower joint surfaces 128 contact corresponding upper joint surfaces 134 of the upper section 130. The contact of the lower joint surface 128 with the upper joint surface 134 forms a joint 136, which seals the temperature sensitive material within the shell 110. The lower joint surface 128 and upper joint surface 134 are optically polished to facilitate diffusion bonding of the joint 136.

The upper section 130 is positioned over the lower section 120 to form the shell 110 and to define the cavity 140. The upper section 130 can be any of a variety of shapes that correspond to the particular configuration of the lower section 120, to define and seal the cavity 140. The upper section 130 may be a round disk conveniently sized to approximately match the size and shape of the lower section 120. The upper section 130 may be formed of substantially uniform thickness with a substantially flat top surface 132. The thickness of the upper section 130 can vary depending the material used and on the specific application of the sensor 100. Around the outer edge of the underside of the upper section 130 is the upper joint surface 134, which is sized and shaped to contact the lower joint surface 128 for forming the joint 136.

The lower section 120 and the upper section 130 can be of different configurations than that shown in FIGS. 1 and 2. For example, in some embodiments, the upper section 130 has side portions that extend downward to meet the lower section 120 and aid in defining the cavity 140. In fact, in some embodiments, the lower section 120 is substantially planar, lacking the upward extending side portions 126. Instead, side portions (not shown) of an upper section depend down from the upper section to meet a planar lower section.

The joint 136 may be formed without an inorganic or organic bonding aid. The joint 136 may be non-adhesive bonded vby commercially available processes and techniques from Onyx Optics, Inc. of Dublin, California. One process available from Onyx Optics is ADHESIVE FREE BONDING (AFB). A non-adhesive bond can be obtained through diffusion bonding.

Diffusion bonding can include, for example, the process of first polishing the two surfaces to be joined (until optically flat—on the order of one micron), cleaning the polished surfaces, placing the assembly in an oven/vacuum chamber (or similar device), applying heat (usually to a temperature substantially below the melting point of the assembly), reducing the atmospheric pressure, and applying pressure on the bodies over a period of time to cause the surfaces to bond.

Figure 4:
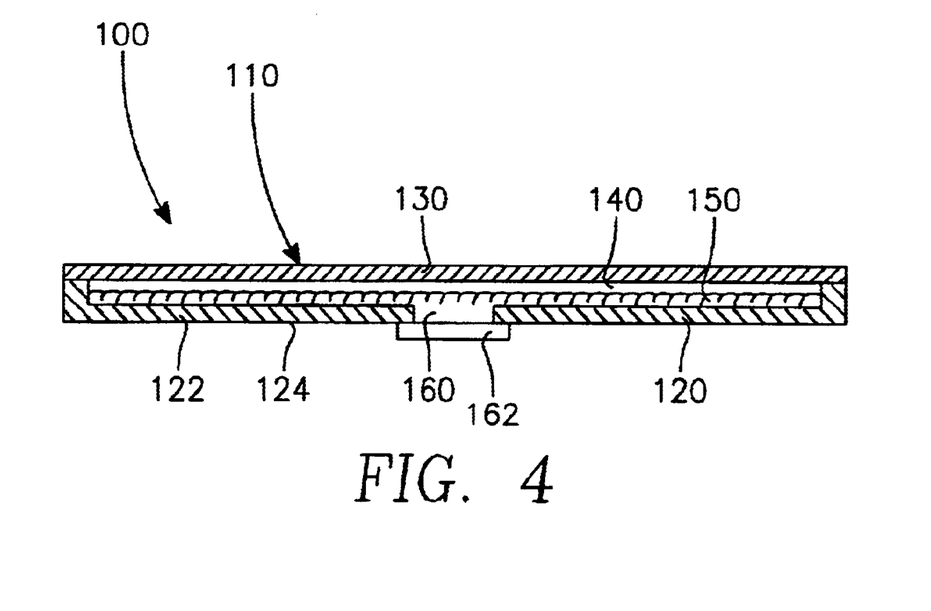
FIG. 4 is a side cross-sectional view of a sensor assembly in accordance with an embodiment of the present invention.

The bonding temperature of the diffusion bonding process is below the maximum operational temperature of the temperature sensitive material 150. In this manner the material 150 (e.g. phosphor) can be applied prior to the diffusion bonding process. This allows the material 150 to be sealed within the shell 110. In situations where the bonding temperature is greater than the maximum operational temperature of the temperature sensitive material 150, the material 150 may be added to the sensor 100 after the diffusion bonding. A structure, which allows such later addition of the material 150, is shown in FIG. 4 and described in detail herein.

In other embodiments of the present invention, an adhesive can be used to bond the shell 110. Such embodiments may be used in environments such as outside the chamber.

Figure 9A:
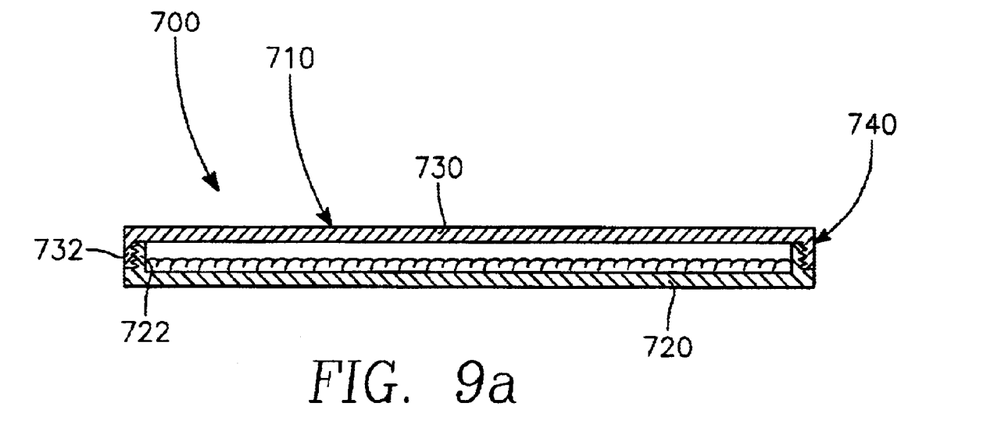
FIG. 9a is a side cross-sectional view of a sensor assembly in accordance with an embodiment of the present invention.
Figure 9B:
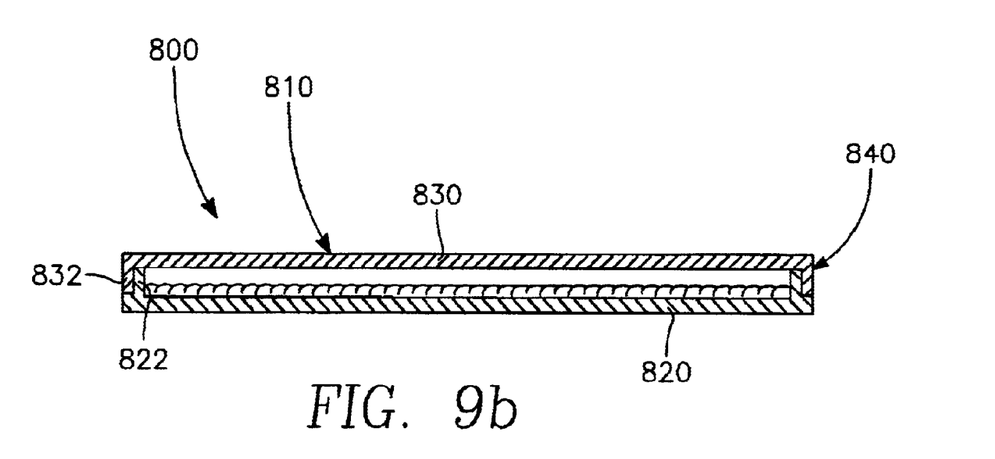
FIG. 9b is a side cross-sectional view of a sensor assembly in accordance with an embodiment of the present invention.

In certain embodiments, the shell of the sensor is bonded together by a non-adhesive interlocking structure and/or an interference fit. FIG. 9a (FIG. 9a) shows a sensor 700 with a shell 710 having an upper section 730 secured to a lower section 720 by an interlocking mount 740. The lower section 720 has a side wall 722, which interlocks with a side wall 732 of the upper section 730. The interlocking mount 740 can be a screw mount. FIG. 9b shows a sensor 800 with a shell 810 having a lower section 820 and an upper section 830. The lower section 820 has a side wall 822, which is shaped to fit together with a side wall 832 of the upper section 830. The side wall 822 and the side wall 832 are sized to form an interference fit 840 therebetween. In other embodiments diffusion bonding or adhesives are used at the interlocking mount 740 or the interference fit 840 to further secure the upper and lower sections together.

Returning to FIGS. 1 and 2, the cavity 140, defined by the shell 110, functions to retain the temperature sensitive material 150. The size and shape of the cavity 140 can vary depending the needs of the specific use. However, in this embodiment the cavity 140 is a substantially uniform thickness and sized to contain enough temperature sensitive material 150 to allow for sufficient radiation emission for temperature determination. The larger the cavity 140, and thus the more material 150, the greater the allowable error in aiming the optical fiber 200 will be. In the embodiment shown in FIGS. 1 and 2, the cavity 140 follows the external shape of the sensor 100, round with a rectangular cross-section, as shown in FIGS. 1 and 2. The cavity 140 can be filled with any of a variety of gases (non-reactive) at any pressure suitable for the particular operating range of the sensor 100.

The temperature sensitive material 150 is sealed within the cavity 140, as shown in FIG. 2. The temperature sensitive material 150 emits radiation that is measured by external means to determine the temperature of the material. The amount and character of radiation emitted by the temperature sensitive material 150 is directly dependent on the temperature of the material. For some temperature sensitive material the radiation emitted are light waves.

The temperature sensitive material 150 can be applied within the cavity 140 by a variety of methods including depositing a power, screen printing, painting, or securing with a clear adhesive.

In some embodiments, the temperature sensitive material 150 is a phosphorescent material, such as phosphor. Phosphor is a chemical substance that exhibits fluorescence when excited. Excitation can be by a variety of means including a light beam, ultraviolet radiation, x-rays, an electron beam or the like. Typically, the amount of visible light is proportional to the amount of excitation energy. In certain embodiments the phosphor is magnesium fluorogermanate (MFG) activated with tetravalent manganese. Phosphor is commercially available from Luxtron Corporation of Santa Clara, Calif. One such phosphor available from Luxtron is MFG2 Phosphor Sensor Powder (PN 01-11808-01).

With the sensor 100 positioned within a chamber, the shell 110 can be sealed sufficiently that the phosphor is not exposed to the chamber environment. Because phosphor can be a semiconductor dopant, its exposure into a semiconductor processing chamber can cause significant damage to the wafer being processed.

The phosphor can be in a variety of forms, such as a powder or a solid (e.g. dried from a liquid form when applied). To secure the phosphor in place, it can be mixed with an adhesive, a binder or a polymer to adhere it in place.

The securing agent should be a material having high transparency, high temperature stability, chemical inertness, resistance to blue or ultraviolet light, ease of forming and curing. Such adhesives, binders or polymers are commercially available from Luxtron Corporation of Santa Clara, Calif. Binders available from Luxtron include 150° C. Silicone Binder (PN 01-10921-01), 250° C. Silicone Binder (PN 01-10921-03) and 450° C. Potassium Silicate Binder (PN 01-10921-05).

While the amount of the temperature sensitive material 150 contained in the cavity 140 can vary, the temperature sensitive material 150 may be positioned continuously across the cavity 140, such that there are no gaps or voids in the coverage. It has been found that such a continuous application of the material 150 in the cavity 140, reduces the potential for errors in the temperature determination. To increase the gain of the radiation signal emitted by the temperature sensitive material 150, a greater amount of material 150 is placed in the cavity 140.

The optical fiber 200 can be used to both measure the radiation emitted from the sensor 100 and to transmit a radiation signal to the sensor 100. The signal excites the temperature sensitive material 150, causing it in turn to emit radiation. In some embodiments of the present invention, an optical signal transmitted via the optical fiber 200 first flashes the temperature sensitive material 150 with light, and then the optical fiber 200 transmits the light emitted from the material 150, allowing a determination of the temperature of the sensor 100.

Figure 3:
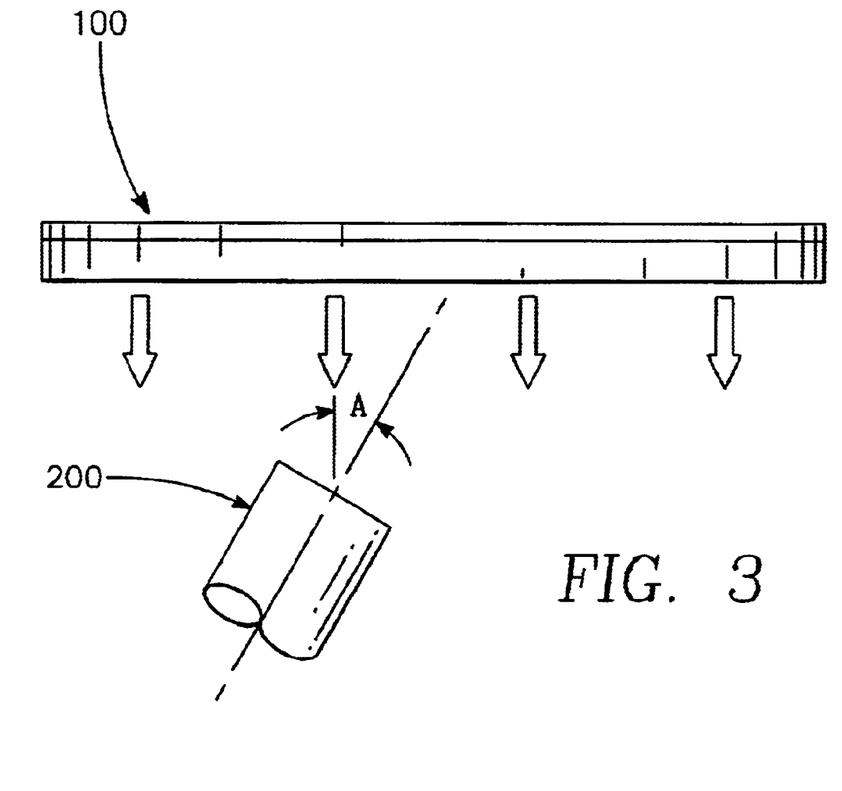
FIG. 3 is a side view of a sensor assembly in accordance with an embodiment of the present invention.

Since the shell 110 is generally transparent to the radiation emitted from the temperature sensitive material 150, the optical fiber 200 can be at any location around the sensor 100. That is, since the temperature sensitive material 150 emits its radiation through the shell 110 in all directions, the optical fiber 200 can still receive the emitted radiation regardless of where it is positioned about the sensor 100. Nevertheless, the position of the optical fiber 200 relative to the radiation it receives, must be within certain limits. That is, the radiation source must be within the acceptance angle of the optical fiber 200. Specifically, as shown in FIG. 3 (FIG. 3), the angle A between the direction of the optical fiber 200 and the radiation emitted from the sensor 100 must be less than the maximum reception angle of the optical fiber 200. The maximum reception angle can vary and is dependent on the characteristics of particular optical fiber used.

In one illustrative embodiment, the optical fiber 200 is substantially aligned with the emitted radiation (e.g. angle A being near, or at, zero). While the distance between the optical fiber 200 and the sensor 100 can vary, the optical fiber 200 must be close enough to the sensor 100 to allow reception of the radiation signal.

The optical fiber 200 may also be positioned relative to the sensor 100, such that the fiber can transmit a signal to the temperature sensitive material 150 to excite it. Like with the maximum reception angle, the particular type of optical fiber used will have a distinct transmission angle. Therefore, the optical fiber 200 may be positioned such that the temperature sensitive material 150 is within the transmission angle of the optical fiber 200. Also, the optical fiber 200 should be close enough so that the in temperature sensitive material 150 is sufficiently excited by the radiation emitted by the optical fiber 200, to allow a proper temperature reading to be determined.

In some embodiments of the present invention a lens (not shown) is positioned between the end of the optical fiber 200 and the temperature sensitive material 150. The lens functions to focus and direct the radiation signal.

The optical fiber 200 can be a remote sensing probe, SSP-XX xx (PN-0011537-XX) commercially available from Luxtron Corporation of Santa Clara, Calif.

In certain embodiments of the Applicants' invention, more than one optical fiber is used. For example, one optical fiber is used to excite the material 150 while another is used to receive the emitted radiation signals. Mirrors, prisms and lenses can also be used with the optical fiber(s) to direct and define the radiation signals. However, to limit losses, the overall sensor/optical fiber system likely would have less than 3 to 5 free optical surfaces. The change in the index of refraction between surfaces (e.g. air to glass) causes a loss in the signal strength. This loss can be about 3 percent for each change in the index of refraction.

FIG. 4 (FIG. 4) shows an embodiment of the Applicants' invention where an opening 160 is set in the bottom section 122 of the sensor 100. This embodiment allows the temperature sensitive material 150 to be deposited into the cavity 140 after the lower section 120 and upper section 130 have been bonded together. For example, a phosphor in a liquid form is poured through the opening 160 into the cavity 140 and allowed to dry.

Depending on the needs of the specific use of the sensor 100, the opening 160 can be left open or sealed. For use of the sensor 100 within plasma chambers, the opening 160 may be sealed. As shown in FIG. 4, the opening 160 is sealed with a cap 162. The cap 162 can be made of any of a variety of materials, e.g., a material similar to that of the shell 110, such as, sapphire or quartz. The cap 162, in this example, is attached to the bottom section 122 by a non-adhesive bond (e.g. diffusion bonding), to inhibit contamination of surrounding structures. As noted herein, non-adhesive bonds can be obtained through commercially available processes and techniques.

The opening 160 can be positioned at any point about the shell 110. The size of the opening 160 can vary, but it is in this example at least large enough for the deposition of the temperature sensitive material, and is minimized in size.

Figure 5A:
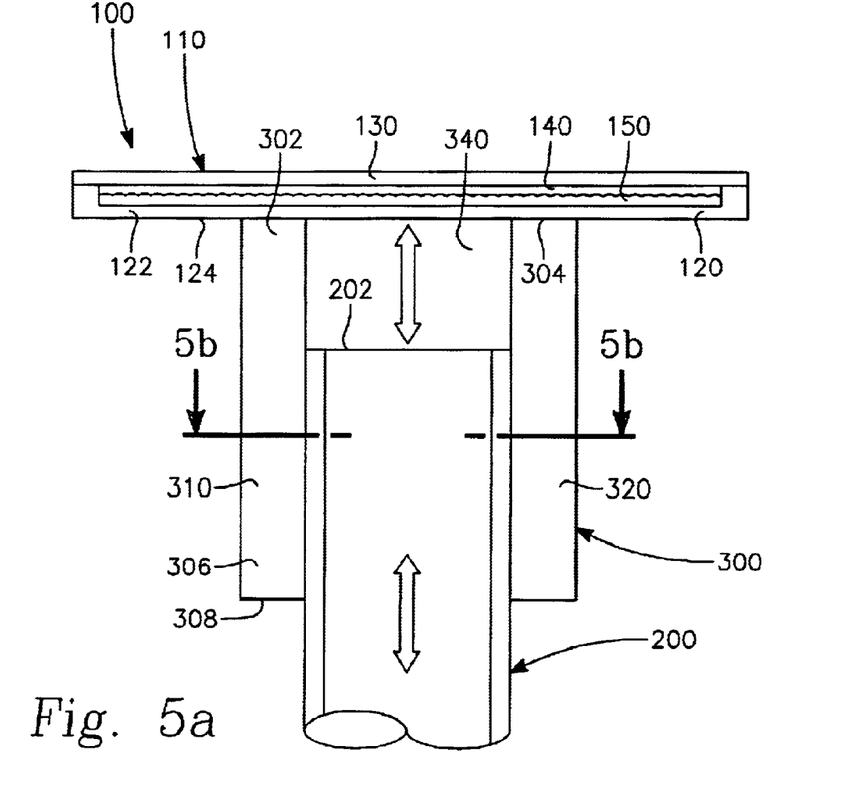
FIG. 5a is a side cross-sectional view of a sensor assembly in accordance with an embodiment of the present invention.
Figure 5B:
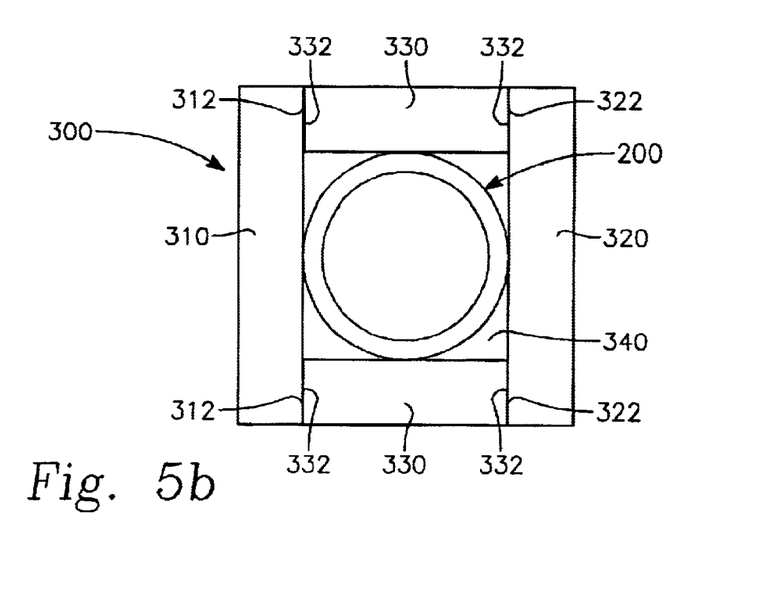
FIG. 5b is a top cross-sectional view along the 5b—5b line of FIG. 5a, of a sensor assembly in accordance with an embodiment of the present invention.
Figure 5C:
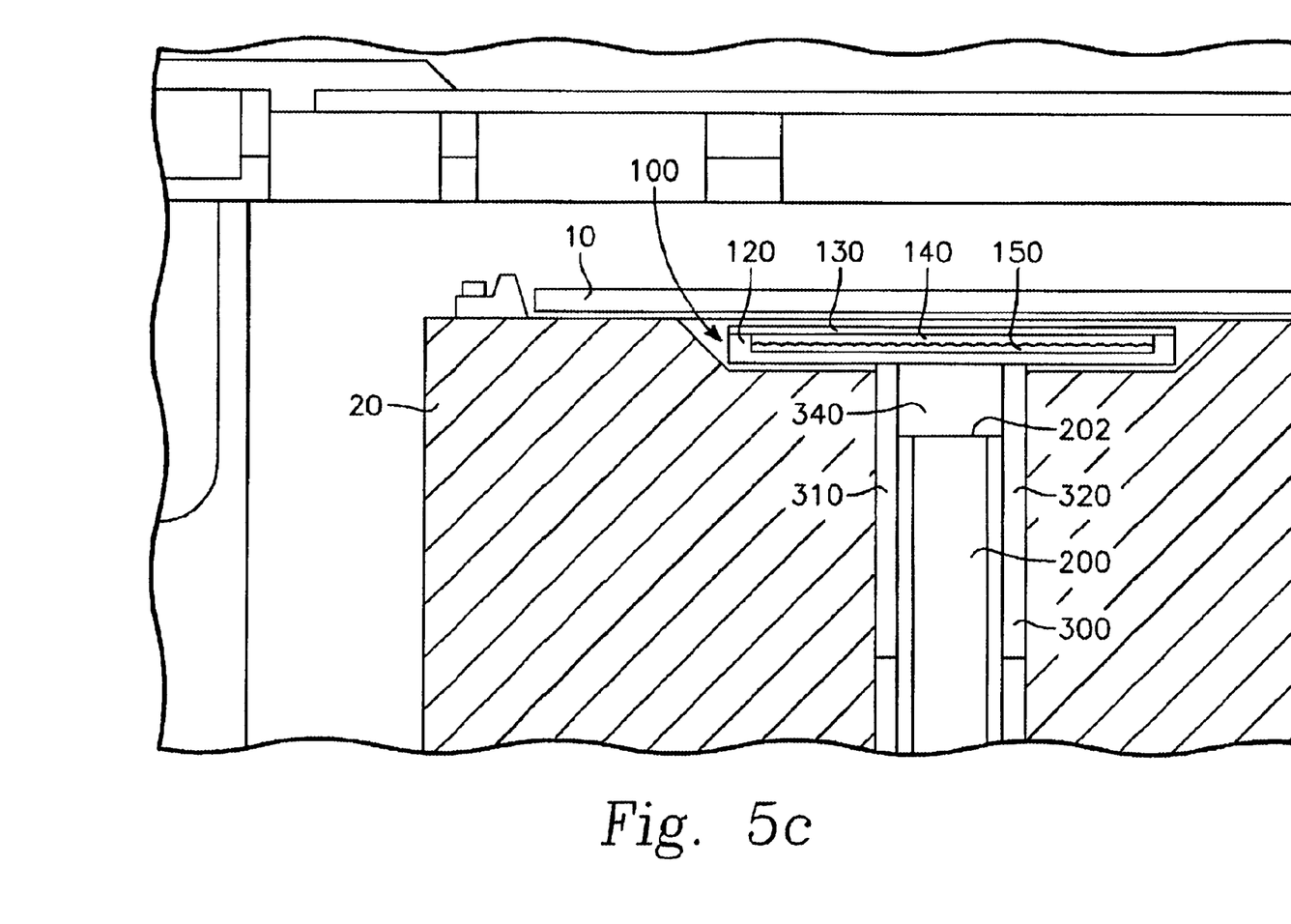
FIG. 5c is a side cross-sectional view of a portion of a plasma reactor having a sensor assembly in accordance with an embodiment of the present invention.

As shown in FIGS. 5a–c (FIGS. 5a–c), some embodiments of the present invention include a stem structure 300. The stem 300 can function to secure and position the optical fiber 200, as well as channel radiation to and from the sensor 100. For channeling radiation, the stem 300 can be any of a variety of materials, which will transmit radiation in the specific wavelengths used in the particular application. Such materials include silicon, glass, plastic, sapphire and quartz.

The embodiment of the stem 300 shown in FIGS. 5a–c has a squared cross-section (as viewed in FIG. 5b). Other shapes can also be used, for example the stem 300 can have a circular cross-section.

As shown in FIG. 5a, in some embodiments, the stem 300 functions to position the optical fiber 200 so that the end 202 is located adjacent to, and aligned with, the sensor 100. The optical fiber 200 can be secured to the stem 300 to keep it in place. The optical fiber 200 can be secured by a variety of methods including by an interference fit and by adhesives. This assures that the optical fiber 200 is continuously positioned to receive radiation emitted from the sensor 100.

The stem 300 is secured to the bottom surface 124 of the sensor 100. Here, the stem 300 is secured by non-adhesive bonding, such as with diffusion bonded joints. As noted herein, non-adhesive bonds can be obtained through commercially available processes and techniques. In this manner, the sensor and stem assembly can be used in a plasma chamber without introducing contamination.

As shown in FIGS. 5a–c, the stem 300 includes an upper end 302 with an upper surface 304 and a lower end 306 with a lower surface 308. The stem 300 further includes a first side member 310, a second side member 320 and two connecting members 330. The connecting members 330 are positioned between the first side member 310 and the second side member 320, defining a channel 340. The channel 340 is sized to receive the optical fiber 200. In some embodiments the channel 340 is round.

To avoid the possibility of contamination, the first side member 310, second side member 320 and two connecting members 330 can be secured to one another by non-adhesive bonds, such as optically polished and diffusion bonded joints. In this regard, the connecting members 330 have ends 332 which are optically polished. Likewise, the end portions 312 of the first side member 310 and the end portions 322 of the second side member 320 are optically polished.

Instead, or in addition to, directing radiation through the optical fiber 200, the stem 300 itself can be used to direct radiation signals. That is, with the stem 300 being made of a material, which allows transmission of a radiation signal (e.g. sapphire or quartz), the radiation signal being emitted by the sensor 100 is received at the upper surface 304, transmitted along the stem 300 and exited out at the lower surface 308. In the same manner, an excitation signal can be sent through the stem 300 and into the sensor 100 to excite the temperature sensitive material 150. The first side member 310, second side member 320 and two connecting members 330 each can be used to transmit radiation signals.

In some embodiments of the present invention, the stem 300 is a single solid member that allows the transmission of the radiation signals to and from the sensor 100. in such embodiments the end 202 of the optical fiber 200 can positioned against the lower end of the stem 300 for receiving and transmitting radiation signals.

Although FIGS. 5a and 5c show the stem 300 positioned under the sensor 100, the stem 300 can clearly be positioned in other locations about the sensor 100, depending on the size and shapes of the embodiment of the stem 300 and the sensor 100.

Figure 6A:
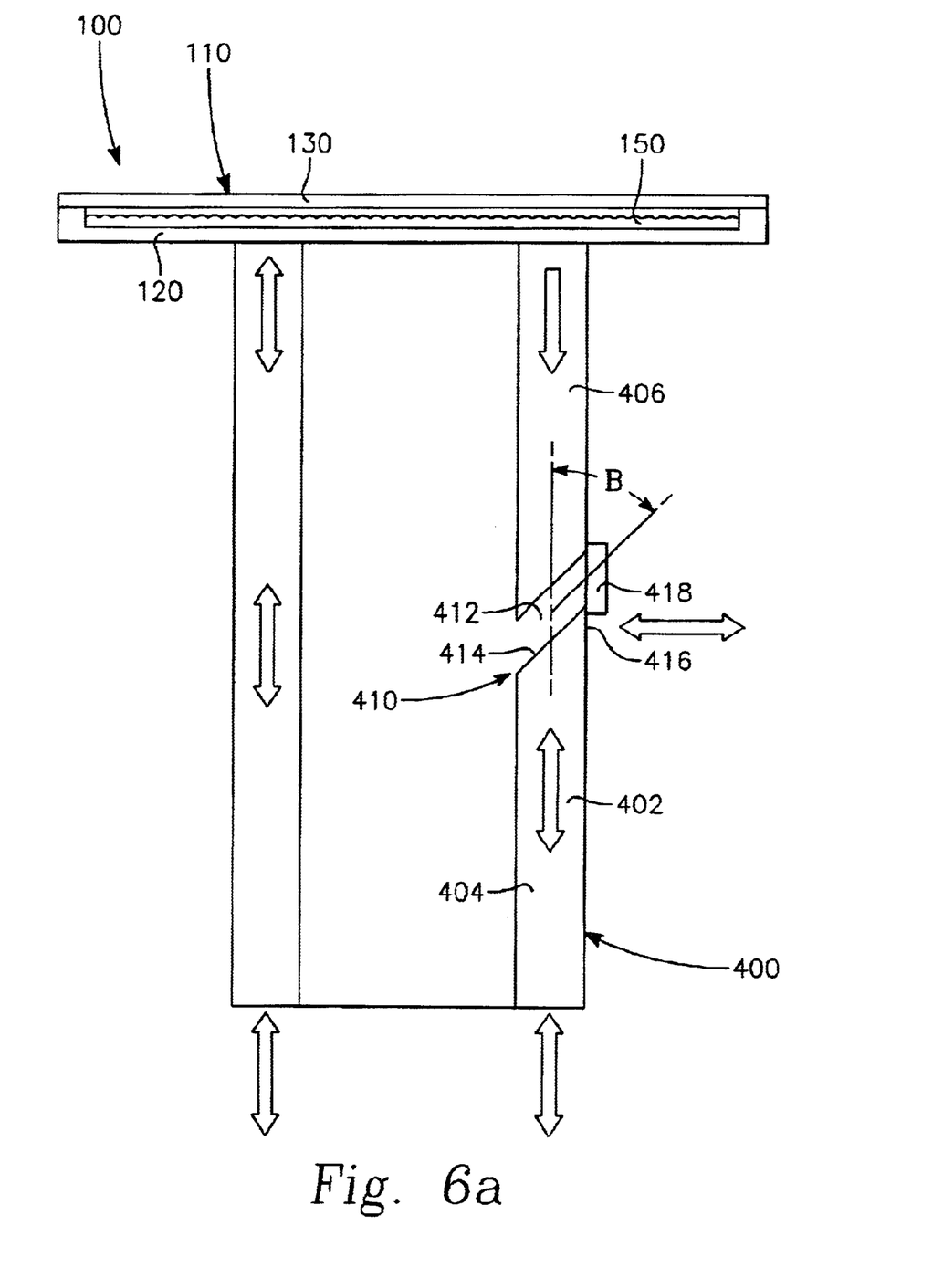
FIG. 6a is a side cross-sectional view of a sensor assembly in accordance with an embodiment of the present invention.
Figure 6B:
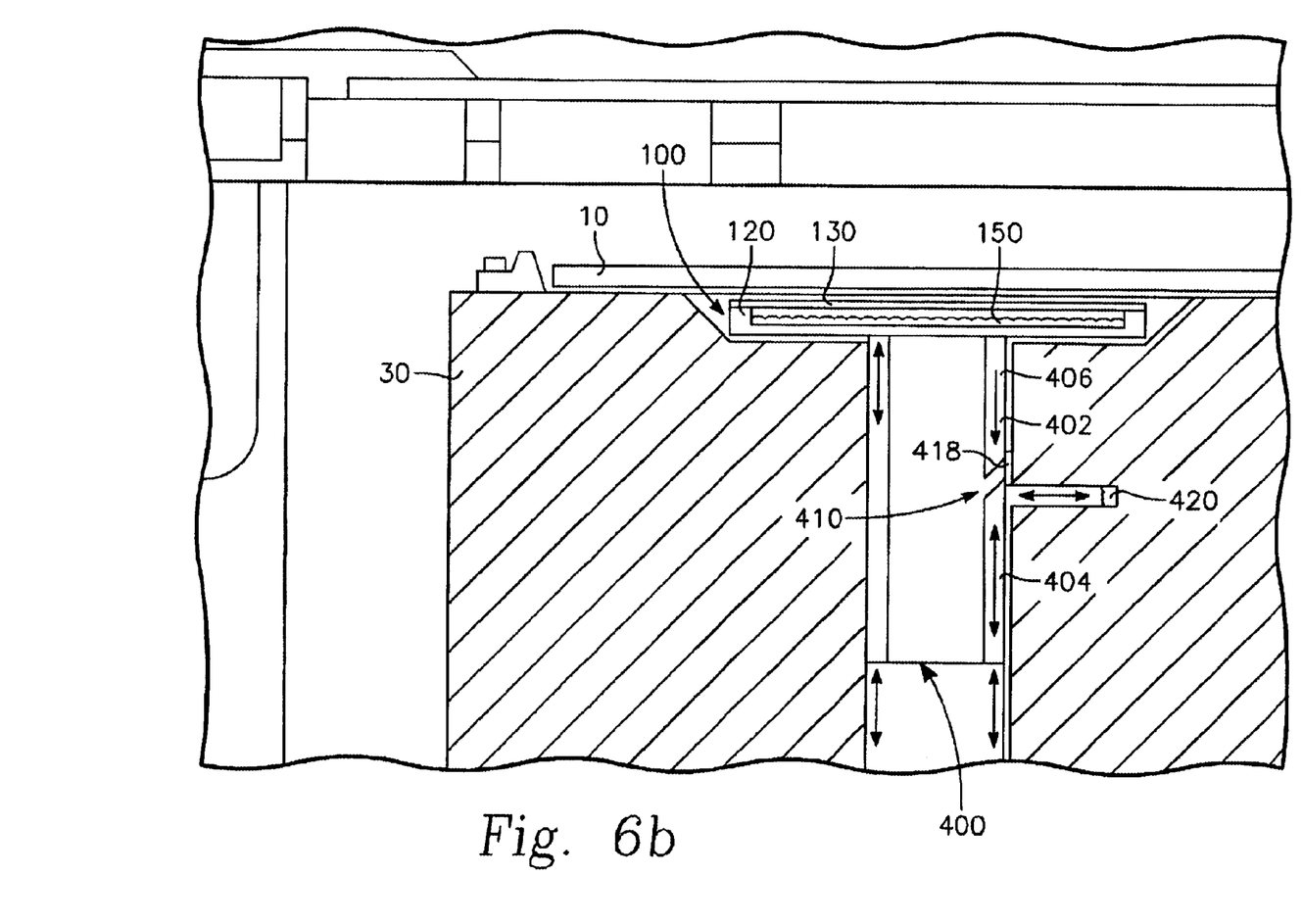
FIG. 6b is a side cross-sectional view of a portion of a plasma reactor having a sensor assembly in accordance with an embodiment of the present invention.

In some embodiments, the present invention also includes a stem 400 which has a prism 410 positioned within it, as shown in FIGS. 6a and b (FIGS. 6a and b). The prism 410 functions to deflect a radiation signal within the stem 400, such that the signal can be directed out from the stem 400. This allows a second temperature sensor to be used with the stem 400. As shown in FIG. 6b, one example of such a use is a second temperature sensitive material 420 being applied within the substrate support member 30 for measuring the temperature of the substrate support member 30. This allows the temperature of an object (e.g. the substrate) to be measured in-situ through the measurement of the temperature of an intermediate member (e.g. the sensor 100), having a known thermal relationship with an adjacent object (e.g. the substrate support member 30). One such in situ temperature measurement scheme is set forth in U.S. Pat. No. 5,876,119, entitled "IN-SITU SUBSTRATE TEMPERATURE MEASUREMENT SCHEME IN PLASMA REACTOR", by Ishikawa, et. al., hereby incorporated by reference in its entirety.

The stem 400 can be made of any of a variety of materials that allow transmission of radiation signals, including silicon, glass, plastic, sapphire and quartz.

As shown in FIGS. 6a and b, the prism 410 is positioned along a waveguide 402. The prism 410 includes a gap 412, a polished angled surface 414 and a window 416.

The gap 412 runs across the waveguide 402 separating the waveguide 402 into a lower segment 404 and an upper segment 406. The lower segment 404 allowing transmission of radiation signals to and from the prism 410. By separating the waveguide 402 into two segments the gap 412 functions to isolate the radiation signals associated with the second temperature sensitive material 420 from the signals associated with the sensor 100. A radiation signal coming from the sensor 100 travels through the upper segment 406 but terminates at the gap 412. Whereas a radiation signal from the temperature sensitive material 420 enters the waveguide 402 at the window 416, reflects off the angled surface 414 and travels down the lower segment 404 to a temperature measurement device (not shown). As such, the sensor 100 and the temperature sensitive material 420 can be excited and measured completely independently of each other, allowing two separate temperature measurements to be made. The gap 412 also functions to provide an angled surface, which when polished forms the polished angled surface 414.

The gap 412 can be filled with the gas of the surrounding environment, or in some embodiments, the gap is filled with a material which has a different index of refraction from that of the waveguide 402 and which can be diffusion bonded to the waveguide 402. The diffusion bonding sealing the stem 400 from the external environment and the different index of refraction causing the radiation signal to reflect off of the surface 414.

The polished surface 414 allows the deflection of radiation signals within the waveguide 402. To accomplish this, the polished surface 414 may be optically polished. The polished surface 414 is set at an angle B relative to the radiation signal in the lower segment 404. While, in this example, the angle B is substantially at 45°, the angle can be greater or less than 45° depending on the position of the temperature sensitive material 420 relative to the polished surface 414. The specific value of the angle B needed to allow transmission between the waveguide 402 and the temperature sensitive material 420 can be determined by one skilled in the art using well-known analytical and/or empirical methods.

Referring to FIG. 6a, the window 416 is positioned on the outside edge of the waveguide 402, at the point where the radiation signals pass into and out of the waveguide 402. In embodiments where the stem 400 lacks a flat surface (e.g. a rounded stem), a flat facet may be created at the window 416.

A cap 418 can also be positioned over the opening created by the gap 412. The cap 418 functions to seal the stem 400 from the surrounding environment. The cap 418 can be mounted to the stem 400 by any of a variety of methods, e.g., a nonadhesive bond, such as diffusion bonding, may be used. As noted herein, such a non-adhesive bond can be obtained through commercially available processes and techniques. With diffusion bonding of the cap 418 to the stem 400, both the contact surfaces of the cap 418 and the stem 400 can be optically polished.

In some embodiments of the present invention, in place of the temperature sensitive material 420 a second sensor (not shown, typically smaller than, but similar to, the first sensor 100, can be used to provide a temperature measurement of the support member 30. This provides the benefit that the temperature sensitive material is not exposed to the surrounding environment. In other embodiments, a temperature sensitive material is positioned over the window 416 on the outside of the waveguide 402. In still other embodiments, the stem 400 is rounded with coaxial inner and outer waveguides. In these embodiments the inner waveguide is used to carry radiation signals to and from the sensor 100 while the outer waveguide is used to carry radiation signals to and from the temperature sensitive material positioned on or in the support member 30.

Figure 7:
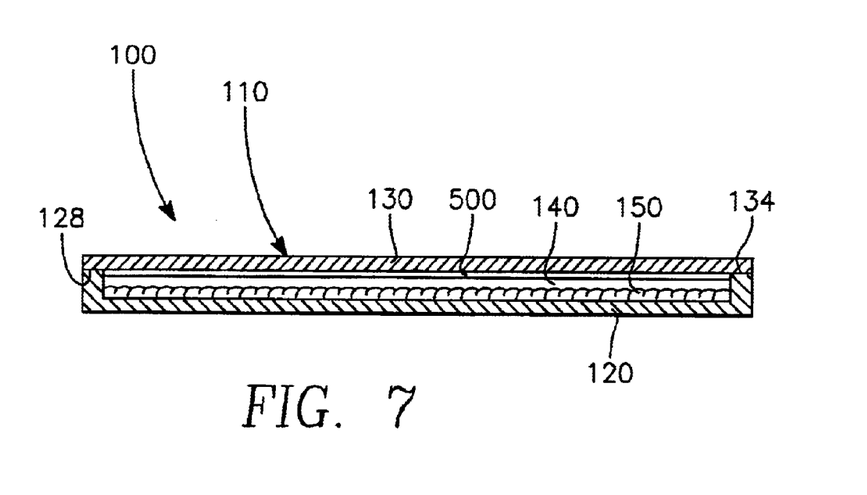
FIG. 7 is a side cross-sectional view of a sensor assembly in accordance with an embodiment of the present invention.

In order to avoid, or limit, radiation heating of the temperature sensitive material 150, in some embodiments of the Applicants' invention, a reflective member is used. As shown in FIG. 7 (FIG. 7), a reflective shield 500 can be positioned to shield the temperature sensitive material 150 from radiation heating. Specifically, when the sensor 100 is used in a plasma chamber, the reflective shield 500 acts to inhibit plasma radiation heating of the temperature sensitive material 150. The reflective shield 500 can be a metalized reflecting layer or a mirror.

The reflective shield 500 can be positioned as needed about the temperature sensitive material 150 to inhibit radiation heating. As shown in FIG. 7, the reflective shield 500 is positioned above the temperature sensitive material and below the upper section 130 of the shell 110. Although not show, the reflective shield 500 can also be positioned about the sides of the temperature sensitive material 150.

The reflective shield 500 can be applied by CVD or sputtering, with photolithography used to prevent deposition on either the lower joint surfaces 128 or the upper joint surfaces 134. This keeps from shield material from interfering with the diffusion bonding of the lower section 120 and the upper section 130.

Figure 8:
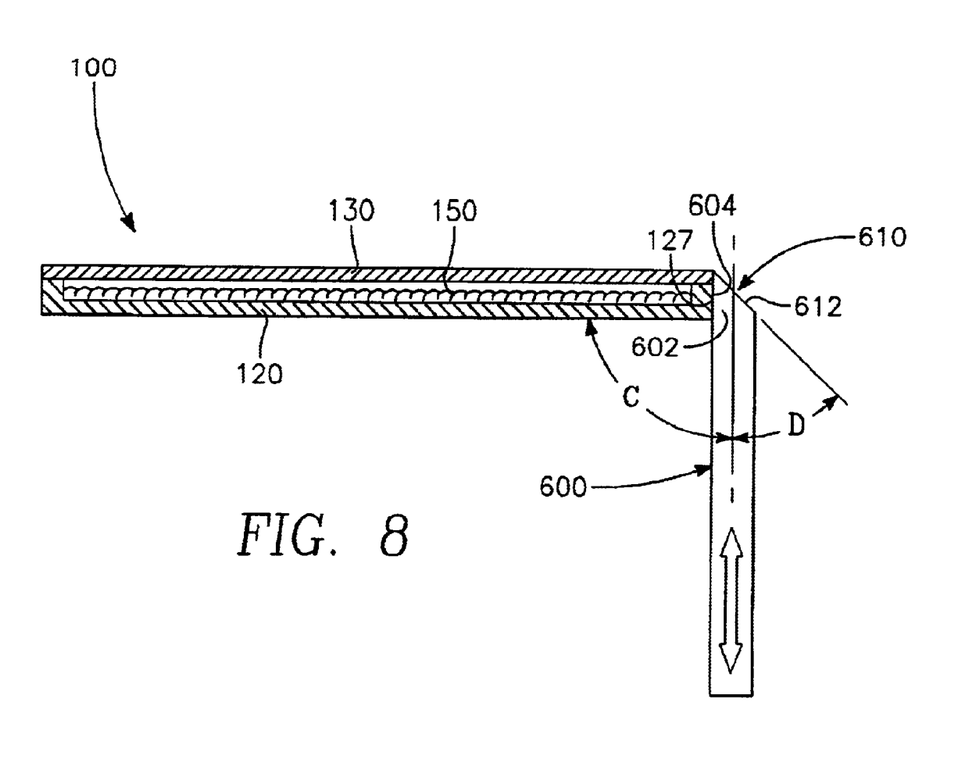
FIG. 8 is a side cross-sectional view of a sensor assembly in accordance with an embodiment of the present invention.

As shown in FIG. 8 (FIG. 8), the present invention can be embodied in a cantilever design. In this embodiment a waveguide 600 is attached to a side of the sensor 100. A prism 610 is positioned at an end 602 of the waveguide 600, to deflect the radiation signals. The prism 610 is created by forming a polished angled surface 612 at the end 602, such as by optically polishing. The polished surface 612 allows the deflection of radiation signals within the waveguide 600.

The waveguide 600 also includes a contact surface 604, which mat contact a flattened side surface 127 of the sensor 100. The waveguide 600 can be mounted to the sensor 100 by any of a variety of methods, including non-adhesive bonding, such as diffusion bonding, as discussed above.

The waveguide 600 is positioned at an angle C relative to the sensor 100, as shown in FIG. 8. Depending on the embodiment of the present invention, the angle C may be substantially 90°, such that the surface 612 is angled at angle D, 45° to the direction of the radiation beam passing through the waveguide 600. Angle C may be varied so long as the surface 612 is positioned to continue to reflect the radiation signal to and from the sensor 100 and along the waveguide 600.

The waveguide 600 can be made of any of a variety of materials that allow transmission of radiation signals, including silicon, glass, plastic, sapphire and quartz.

In some embodiments, more than one prism 610 is used in the waveguide 600 to direct the radiation signal.

While embodiments of the present invention have been described in detail above, many changes to these embodiments may be made without departing from the true scope and teachings of the present invention. The present invention, therefore, is limited only as claimed below and the equivalents thereof.

What is claimed is:

1. A sensor comprising:
a temperature sensitive material; and
a shell containing the temperature sensitive material, the shell having a first section and a second section, wherein the first section and second section are attached by a non-adhesive bond.

2. The sensor of claim 1, wherein the non-adhesive bond is an atomic bond.

3. The sensor of claim 1, wherein the non-adhesive bond is a diffusion bond.

4. The sensor of claim 3, wherein the temperature sensitive material is capable of emitting a radiation signal.

5. The sensor of claim 4, wherein at least a portion of the shell allows transmission of the radiation signal through the shell.

6. The sensor of claim 5, wherein the temperature sensitive material is phosphorescent.

7. The sensor of claim 6, wherein the temperature sensitive material is phosphor.

8. The sensor of claim 3, wherein the shell comprises a material capable of being diffusion bonded.

9. The sensor of claim 5, wherein the shell comprises at least one of silicon, glass, plastic, sapphire or quartz.

10. The sensor of claim 5, wherein the shell comprises at least one of sapphire or quartz.

11. The sensor of claim 1, wherein the temperature sensitive material is substantially sealed in the shell.

12. The sensor of claim 11, wherein the temperature sensitive material is hermetically sealed in the shell.

13. The sensor of claim 12, wherein the non-adhesive bond is a diffusion bond.

14. The sensor of claim 5, wherein the shell is substantially transparent to the radiation signal.

15. The sensor of claim 5, further comprising a stem attached to the shell, wherein the stem positions an optical fiber for receiving radiation signals from the sensor.

16. The sensor of claim 5, further comprising a waveguide for transmitting radiation signals, wherein the waveguide is attached to the shell.

17. The sensor of claim 16, wherein the waveguide is attached to the shell by a non-adhesive bond.

18. The sensor of claim 17, wherein the waveguide is attached to the shell by a diffusion bond.

19. The sensor of claim 16, wherein the waveguide further comprises a prism for deflecting radiation signals within the waveguide.

20. The sensor of claim 1, further comprising a shield positioned so as to be capable of limiting radiation heating of the temperature sensitive material.

21. The sensor of claim 1, wherein the first section and second section are attached by at least one of an interlocking mount and an interference fit.

22. The sensor of claim 21, wherein the interlocking mount is a screw mount.

23. A temperature sensor assembly comprising:
a shell having an upper section and a lower section. defining a cavity therein, wherein the upper section and the lower section are attached by a non-adhesive bond; and
a first temperature sensitive material capable of emitting a radiation signal, positioned within the cavity.

24. The temperature sensor assembly of claim 23, wherein the non-adhesive bond is a diffusion bond.

25. The temperature sensor assembly of claim 24, wherein the shell is substantially transparent to the radiation signal.

26. The temperature sensor assembly of claim 25, wherein the first temperature sensitive material is phosphor.

27. The temperature sensor assembly of claim 26, wherein the shell comprises at least one of silicon, glass, plastic, sapphire or quartz.

28. The temperature sensor assembly of claim 26, wherein the shell is comprises at least one of sapphire or quartz.

29. The temperature sensor assembly of claim 28, wherein the first temperature sensitive material is substantially sealed in the shell.

30. The temperature sensor assembly of claim 29, wherein the first temperature sensitive material is hermetically sealed in the shell.

31. The temperature sensor assembly of claim 23, further comprising a stem attached to the shell, wherein the stem positions an optical fiber for receiving the radiation signal from the sensor.

32. The temperature sensor assembly of claim 23, further comprising a first waveguide attached to the shell.

33. The temperature sensor assembly of claim 32, wherein the first waveguide is diffusion bonded to the shell.

34. The temperature sensor assembly of claim 33, wherein the first waveguide comprises at least one of silicon, glass, plastic, sapphire or quartz.

35. The temperature sensor assembly of claim 33, wherein the first waveguide comprises at least one of sapphire or quartz.

36. The temperature sensor assembly of claim 33, further comprising a second waveguide diffusion bonded to at least one of the shell or the first waveguide.

37. The temperature sensor assembly of claim 36, further comprising a second temperature sensitive material capable of emitting a radiation signal, and wherein the second waveguide further comprises a prism capable of deflecting radiation signals between the second waveguide and the second temperature sensitive material.

38. The temperature sensor assembly of claim 37, wherein the first waveguide and the second waveguide are co-axial.

39. The temperature sensor assembly of claim 23, further comprising a reflective shield positioned adjacent to the temperature sensitive material so as to be capable of limiting radiation heating of the temperature sensitive material.

40. The temperature sensor assembly of claim 39, wherein the reflective shield comprises one of a metalized reflecting layer or a mirror layer.

41. The temperature sensor assembly of claim 32, wherein the first waveguide is positioned in a cantilever arrangement with the shell, wherein the first waveguide further comprises a prism for deflecting radiation signals between the first waveguide and the first temperature sensitive material.

42. The sensor of claim 23, wherein the upper section and the lower section are attached by at least one of an interlocking mount and an interference fit.

43. The sensor of claim 23, wherein the interlocking mount is a screw mount.

44. A temperature sensor assembly positioned in a substrate support member and adjacent to a substrate, comprising:

a sensor comprising a shell, wherein the shell comprises: an upper section; a lower section diffusion bonded to the upper section, wherein the upper section and the lower section define a cavity therebetween; and a first temperature sensitive material positioned within the cavity, wherein the first temperature sensitive material is capable of emitting a radiation signal;

a second temperature sensitive material positioned in contact with the substrate support member; and a stem mounted to the sensor, comprising: a first waveguide positioned to be capable of transmitting radiation signals to and from the sensor; and a second waveguide positioned to be capable of transmitting radiation signals to and from the second temperature sensitive material.

45. The temperature sensor assembly of claim 44, wherein the first temperature sensitive material is a phosphor, and wherein the second temperature sensitive material is a phosphor.

46. The temperature sensor assembly of claim 45, wherein the shell comprises at least one of sapphire or quartz, and wherein the stem comprises at least one of sapphire or quartz.

47. A plasma reactor comprising a temperature sensor, the temperature sensor comprising:

a temperature sensitive material; and a shell containing the temperature sensitive material, the shell having a first section and a second section, wherein the first section and second section are attached by a non-adhesive bond.

48. A sensor comprising:

a temperature sensitive material; and a shell containing the temperature sensitive material, wherein the shell comprises at least one of silicon, glass, plastic, sapphire and quartz.

49. The sensor of claim 48, wherein the shell is substantially disk-shaped.

50. The sensor of claim 49, wherein the shell is shaped as a disk.

51. The sensor of claim 48, wherein the temperature sensitive material is phosphorescent.

52. The sensor of claim 51, wherein the temperature sensitive material is phosphor.

53. The sensor of claim 48, wherein the shell comprises a first section and a second section, wherein the first section and second section are attached by an adhesive bond.

* * * * *